United States Patent Office 3,364,199
Patented Jan. 16, 1968

3,364,199
2-ALKYLINOSINES
Akihiro Yamazaki, Tokyo, Takashi Meguro and Izumi Kumashiro, Kanagawa-ken, and Tadao Takenishi, Tokyo, Japan, assignors to Ajinomoto Co., Inc., Tokyo, Japan
No Drawing. Filed Dec. 10, 1965, Ser. No. 513,092
Claims priority, application Japan, Dec. 14, 1964, 39/70,353
6 Claims. (Cl. 260—211.5)

ABSTRACT OF THE DISCLOSURE 2-methyl-inosine, 2-ethyl-inosine, 2-propylinosine and 2',3'-O-isopropylidene derivatives thereof were prepared from AICAR and isopropylidene-AICAR by reaction with lower alkyl esters of lower alkanoic acids in the presence of alkali metal alcoholates.

This invention relates to 2-alkylinosines and certain derivatives thereof, and particularly to compounds of the formula

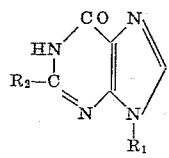

(I)

wherein $R_1$ is, ribofuranosyl or 2',3'-O-propylidene furanosyl, and $R_2$ is methyl, ethyl, or propyl.

Hypoxanthine and its derivatives are physiologically active agents or useful intermediates for the synthesis of such agents, and at least one hypoxanthine derivative, the sodium salt of inosine-5'-phosphate, is a seasoning agent which has a pleasant taste.

We have found that 2-alkylinosines and derivatives thereof are readily prepared from 5-amino-4-carbamoyl-1-β-D-ribofuranosyl imidazole, hereinafter referred to as AICAR for the sake of brevity and derivatives of AICAR by reaction with lower alkyl esters of lower alkanoic acids in the presence of lower alkanoates of the alkali metals.

The compounds which are reacted with the aforementioned esters are of the formula

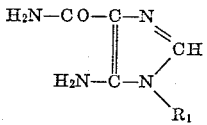

(II)

The alcoholates of all commonly available alkali metals, that is, sodium, potassium and lithium, have been found to be operative as condensation agents, but sodium alcoholates are preferred because of low cost and convenience. All the lower alkanols may be used in preparing the alcoholates but no advantages can be derived from the use of propanols and butanols less readily available and/or less reactive than methanol or ethanol.

AICAR can be prepared by known fermentation methods (Shiro et al., Agr. and Biol. Chem. of Japan, 26, 785, 1962). Its 2',3'-O-isopropylidene derivative hereinafter referred to as Ip-AICAR for brevity, is readily prepared from AICAR by reaction with acetone in an acid medium.

The esters which readily react with AICAR and Ip-AICAR are the methyl, ethyl, propyl and butyl esters of formic, acetic, propionic and butyric acid.

At least one mole of ester is needed per mole of AICAR or Ip-AICAR for complete reaction but the freely available ester is preferably employed in large excess over the more costly heterocyclic reactant for better utilization of the latter. Four to ten moles of ester per mole of AICAR or Ip-AICAR generally give highest yields in terms of the latter reactant.

The amount of alkali metal alcoholate present during the reaction is not critical, and it is preferred to dissolve sodium metal in a large excess of absolute ethanol which also serves as a solvent for the AICAR or Ip-AICAR. The excess of ester also functions as a solvent. Other solvents, inert to the reactants, may be present if so desired, but are not necessary.

The temperature and time required for completing the reaction are inversely related in the usual manner. The reaction takes place at room temperature, though very slowly, and requires a few hours even at the boiling point of the solvents normally present, that is, the excess alcohol and ester. Operation at that temperature is normally preferred. Depending on the nature of the solvents used and the temperature prevailing in the boiling solution, the reaction time for highest yield may vary between approximately one and ten hours.

When the reaction is completed, the alkali metal alcoholate is decomposed by the addition of water, the alkali metal hydroxide so formed is neutralized, and the product is then readily recovered from the solution after evaporation of the organic solvents. If the alkali ions present are replaced by hydrogen ions rather than neutralized by addition of an acid, the aqueous decomposition solution may be evaporated in a vacuum or even at ambient pressure until the 2-alkylinosine or 2-alkylinosine derivative crystallizes. The compounds formed are not readily soluble in water or aqueous ethanol, and may be recrystallized from these solvents.

The invention provides hypoxanthine derivatives not heretofore known.

The following examples are further illustrative of the invention but it will be understood that the invention is not limited thereto and is defined only by the appended claims.

Example 1

Five grams Ip-AICAR were dissolved in a solution prepared from 3 g. sodium and 200 ml. absolute ethanol, and 14.8 g. ethyl acetate were added with stirring. The mixture was refluxed for three hours and was then poured into water. Enough H-type Amberlite IR-120 was added to neutralize the aqueous solution. The resin was removed by filtration, and the clear filtrate was evaporated in a vacuum until crystals started forming. The precipitate recovered was recrystallized from water, and 4.75 g. pure, crystalline 2',3' - O - isopropylidene - 2-methyl inosine were obtained (88% yield). The crystals melted above 240% C., and had a specific rotary power of −84.5° (c.=2) as determined in a 0.1 N NaOH solution at 27° C. with the D line of the sodium spectrum. The compound was identified by elementary analysis:

Found: C, 51.80%; H, 5.74%; N, 17.20%. Calculated for $C_{14}H_{18}O_5N_4$: C, 52.17%; H, 5.63%; N, 17.38%.

The ultraviolet spectrum had maxima at 252 millimicrons at pH 1, and 251 millimicrons at pH 7, and at 256 millimicrons at pH 13. The infrared absorption spectrum when determined by the KBr disk method had values of $\nu_{max}$ at 1375, 1085, and 1390 cm.$^{-1}$ which are assumed to be due to the methyl group of

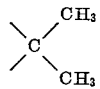

the C—O—C bond, and to the 2-methyl group respectively.

Example 2

When ethyl acetate was replaced in the method of Example 1 by 17.1 g. ethyl propionate under otherwise identical condition, pure crystalline 2′,3′-O-isopropylidene-2-ethyl inosine was obtained in an amount of 3.82 g. (68% yield). This compound was heretofore unknown and decomposes at 212° C. The crystals had a specific rotary power of $[\alpha]_D^{27} = -80.5°$. The ultraviolet absorption spectrum had maxima of 253 millimicrons at pH 1, 251 millimicrons at pH 7, and 256 millimicrons at pH 13. Values of $\nu_{max}$ were found in the infrared absorption spectrum at 1375, 1090, and 1050 cm.$^{-1}$, and were respectively assumed to be due to the methyl group of

the C—O—C bond, and the 2-ethyl group.

Example 3

The corresponding novel 2′,3′-O-isoproylidene-2-n-propyl inosine was produced by the method of Examples 1 and 2 when thyl acetate or ethyl propionate of the preceding methods were replaced by 19.4 ethyl butyrate. The yield was 3.5 g. (60%). The crystals had a melting point of 215–216° C. and had a specific rotary power of $[\alpha]_D^{27} = -79°$. The compound was identified by elementary analysis:

Found: C, 54.84%; H, 6.39%; N, 15.84%. Calculated for $C_{16}H_{22}O_5N_4$: C, 54.84%; H, 6.33%; N, 15.99%.

Maxima were found in the ultraviolet spectrum at 254 millimicrons at pH 1, 252 millimicrons at pH 7, and 256 millimicrons at pH 13. Infrared absorption spectra taken by the KBr disk method had maxima at 1450, 1375, and 1075 cm.$^{-1}$ and these maxima were believed to be due to the n-propyl group, the methyl group of

and to the C—O—C bond respectively.

Example 4

2 g. AICAR were dissolved in a sodium ethylate solution prepared from 40 ml. ethanol and 1 g. sodium metal, and 7.9 g. ethyl propionate were added to the solution whereupon the mixture obtained was refluxed for three hours. When the reaction was completed, 100 ml. water were added, and the pH of the aqueous solution was adjusted to 5.0 by means of Amberlite resin IR–120 which was thereafter removed by filtration. The filtrate was evaporated in a vacuum to crystallize 2-ethyl-inosine. When recrystallized from water, the pure material weighed 1.38 g. (60.2% yield) and melted at 179–181° C. The specific rotary power of the crystals was $$[\alpha]_D^{26} = -42.2°$$

The compound was identified by elementary analysis:
Found: C, 48.06%; H, 5.58%; N, 18.44%. Calculated for $C_{12}H_{16}O_5N_4$.

¼ H$_2$O: C, 47.91%; H, 5.53%; N, 18.63%

Maxima in the ultraviolet spectrum occurred at 252 millimicrons at pH 1, 251.5 millimicrons at pH 7, and 258 millimicrons at pH 13. The R$_f$ values were 0.63 and 0.46 respectively in the afore-mentioned solvent mixtures.

Example 5

When ethyl propionate was replaced in the method of Example 4 by 4.5 g. ethyl butyrate under otherwise identical condition, pure crystalline 2-n-propylinosine was obtained in an amount of 0.92 g. (38.2%). This compound was heretofore unknown and melted at 150–151° C. The crystals had a specific rotary power of $[\alpha]_D^{26} = -48.8$. The ultraviolet absorption spectrum had maxima of 253 millimicrons at pH 1, 251.5 millimicrons at pH 7, and 258 millimicrons at pH 13.

The compound was identified by elementary analysis:
Found: C, 48.93%; H, 5.70%; N, 17.66%. Calculated for $C_{13}H_{18}O_5N_4$.

½ H$_2$O: C, 48.99%; H, 5.98%; N, 17.56%

The R$_f$ values were 0.70 and 0.59 respectively in the afore-mentioned solvent mixtures.

While the invention has been described with reference to specific embodiments, it will be understood that it is not limited thereto but is to be construed broadly and limited solely by the scope of the appended claims.

What is claimed is:

1. A compound of the formula

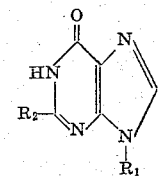

wherein R$_1$ is ribofuranosyl or 2′,3′-O-isopropylidene ribofuranosyl, and R$_2$ is methyl ethyl or propyl.

2. A compound as set forth in claim 1, wherein R$_1$ is ribofuranosyl and R$_2$ is ethyl.

3. A compound as set forth in claim 1, wherein R$_1$ is 2′,3′,-O-isopropylidene ribofuranosyl and R$_2$ is ethyl.

4. A compound as set forth in claim 1, wherein R$_1$ is ribofuranosyl and R$_2$ is n-propyl.

5. A compound as set forth in claim 1, wherein R$_1$ is 2′,3′-O-isopropylidene ribofuranosyl and R$_2$ is n-propyl.

6. A compound as set forth in claim 1, wherein R$_1$ is 2′,3′-O-isopropylidene-ribofuranosyl and R$_2$ is methyl.

References Cited

Bendich et al.: "Jour. Amer. Chem. Soc.," vol. 70, 1948, pp. 3109–3113.

Richter: "Jour. Amer. Chem. Soc.," vol. 82, 1960, pp. 3144–3146.

LEWIS GOTTS, Primary Examiner.

J. R. BROWN, Assistant Examiner.